United States Patent
Yang et al.

(10) Patent No.: US 11,544,578 B2
(45) Date of Patent: Jan. 3, 2023

(54) METHOD, DEVICE AND EQUIPMENT FOR FUSING DIFFERENT INSTANCES DESCRIBING SAME ENTITY

(71) Applicant: Alibaba Group Holding Limited, Grand Cayman (KY)

(72) Inventors: Yang Yang, Guangdong (CN); Guanyu Mu, Guangdong (CN); Nengwei Hua, Guangdong (CN); Wei Zhang, Guangdong (CN); Jia Wu, Guangdong (CN)

(73) Assignee: ALIBABA GROUP HOLDING LIMITED, Grand Cayman (KY)

( * ) Notice: Subject to any disclaimer, the term of this patent is extended or adjusted under 35 U.S.C. 154(b) by 1115 days.

(21) Appl. No.: 16/046,166

(22) PCT Filed: Feb. 6, 2017

(86) PCT No.: PCT/CN2017/072995
§ 371 (c)(1),
(2) Date: Jul. 26, 2018

(87) PCT Pub. No.: WO2017/137000
PCT Pub. Date: Aug. 17, 2017

(65) Prior Publication Data
US 2019/0005392 A1 Jan. 3, 2019

(30) Foreign Application Priority Data
Feb. 14, 2016 (CN) .......................... 201610084741.1

(51) Int. Cl.
*G06F 16/28* (2019.01)
*G06F 16/901* (2019.01)
(Continued)

(52) U.S. Cl.
CPC ............. *G06N 5/02* (2013.01); *G06F 16/288* (2019.01); *G06F 16/901* (2019.01);
(Continued)

(58) Field of Classification Search
CPC .......... G06N 5/02; G06N 5/022; G06N 5/048; G06F 16/288; G06F 16/901; G06F 16/9024; G06K 9/6215
See application file for complete search history.

(56) References Cited

U.S. PATENT DOCUMENTS 10,671,668 B2 * 6/2020 Vaquero Gonzalez ..................... G06F 16/9024
2005/0192926 A1 9/2005 Liu et al.
(Continued)

FOREIGN PATENT DOCUMENTS

CN 101667201 A 3/2010
CN 101714142 A 5/2010
(Continued)

OTHER PUBLICATIONS

1st Examination Report for India Application No. 201817034024 dated Feb. 16, 2022 (8 pages).
(Continued)

*Primary Examiner* — Jorge A Casanova
(74) *Attorney, Agent, or Firm* — Alston & Bird LLP (57) ABSTRACT

Disclosed is a method, a device and equipment for fusing different instances describing the same entity. The method includes: acquiring a connection diagram comprising a plurality of instances, where different nodes in the connection diagram represent different instances, and connection lines between the nodes represent instance relations between the instances corresponding to the nodes; based on the instance relations, identifying different instances describing the same entity in the connection diagram, fusing the nodes
(Continued)

corresponding to the identified instances, and updating the connection diagram.

13 Claims, 7 Drawing Sheets

(51) Int. Cl.
*G06K 9/62* (2022.01)
*G06N 5/02* (2006.01)
*G06N 5/04* (2006.01)

(52) U.S. Cl.
CPC ....... *G06F 16/9024* (2019.01); *G06K 9/6215* (2013.01); *G06N 5/022* (2013.01); *G06N 5/048* (2013.01)

(56) References Cited

U.S. PATENT DOCUMENTS

| | | | |
|---|---|---|---|
| 2008/0183653 A1* | 7/2008 | Byrnes | G06N 5/02 706/50 |
| 2009/0307213 A1 | 12/2009 | Deng et al. | |
| 2010/0082625 A1* | 4/2010 | Tsai | G06F 16/355 707/E17.044 |
| 2010/0228693 A1* | 9/2010 | Dawson | G06F 40/30 707/769 |
| 2015/0081656 A1 | 3/2015 | Wang et al. | |
| 2015/0169758 A1* | 6/2015 | Assom | G06F 16/36 707/603 |
| 2017/0235848 A1* | 8/2017 | Van Dusen | G06N 5/02 705/12 |

FOREIGN PATENT DOCUMENTS

| | | |
|---|---|---|
| CN | 104866625 A | 8/2015 |
| CN | 105045863 A | 11/2015 |
| CN | 105786980 A | 7/2016 |

OTHER PUBLICATIONS

International Searching Authority, International Search Report (ISR) and Written Opinion for International Application PCT/CN2017/072995, dated Apr. 28, 2017, 15 pages, State Intellectual Property Office of the P.R.C., China.

* cited by examiner

METHOD, DEVICE AND EQUIPMENT FOR FUSING DIFFERENT INSTANCES DESCRIBING SAME ENTITY

CROSS-REFERENCE TO RELATED APPLICATION

The present invention claims priority to and the benefit of PCT/CN2017/072995, filed Feb. 6, 2017, which claims priority to Chinese Patent Application No. 201610084741.1, filed with the Chinese Patent Office on Feb. 14, 2016, and entitled Method, Device And Equipment For Fusing Different Instances Describing Same Entity, the entire contents of which are incorporated in their entireties herein by reference.

TECHNICAL FIELD

The present invention relates to the field of computer technology and more particularly, to a method, a device, and equipment for fusing different instances describing the same entity.

BACKGROUNDS ART

A knowledge map is used to describe various entities or concepts that exist in the real world. Each entity or concept in the knowledge map can be identified by a globally unique identifier ID, which is referred to as its identifier. Each attribute-value pair (also referred to as AVP) is used to characterize an intrinsic property of the entity, while a relation is used to connect two entities by characterizing the correlation therebetween.

In the process of constructing a knowledge map, it is necessary to use data from different sources to construct the entities and relations in the map. For example, in order to make the constructed knowledge map more comprehensive, the data from Baidu Encyclopedia, Wikipedia, Sogou Encyclopedia, and many different other encyclopedic website sources may be used to build entities and relations in the knowledge map. However, the entities' different data sources frequently have certain differences, and the instances for description can be very different. As a result, using the fused instance data directly will bring redundancy and error information to the knowledge map. Therefore, it is an important task and step in the process of knowledge map construction to fuse different instances of the same entity.

At present, the commonly used fusing method is to fuse the instance pairs whose attribute similarity exceeds a threshold by means of calculating the attribute similarity between different instances. Although this fusion method is able to identify different instances of the same entity to a certain degree, this fusion method uses the attribute similarity as the only criterion for the fusion of instances, accordingly, the attribute fuzzy matching rules used in the fusion process must be set perfectly in order to effectively identify different instances of the same entity for the fusion. However, the foregoing is very difficult to achieve in practical applications; as a result, it is easy to identify instance pairs that represent the same entity as different instances and accordingly bring redundant data to the knowledge map to be built.

Thus, there is a need for a technical solution that can adequately identify different instances of the same entity.

SUMMARY OF THE INVENTION

The technical problem mainly solved by the present invention is to provide a method, a device and equipment for fusing different instances describing the same entity, which can adequately identify an instance pair describing the same entity.

According to one aspect of the present invention, the present invention provides a computing device, which includes: a memory, which is used for storing a connection diagram comprising a plurality of instances, wherein different nodes in the connection diagram represent different instances, and connection lines between the nodes represent instance relations between the instances corresponding to the nodes; and a processor, which is connected to the memory, wherein the processor is capable of acquiring the connection diagram from the memory, and the processor is configured to: based on the instance relations, identify different instances describing the same entity in the connection diagram, fuse the nodes corresponding to the identified instances, and update the connection diagram; in the updated connection diagram, identify an instance pair with an unidentified instance relation, and add a connection line to connect the nodes corresponding to the instances; iteratively performs the step of updating the connection diagram based on the instance relation and the operation of adding a connection line in the updated connection diagram, until a specified condition is satisfied.

Thus, the device of the present invention can fuse the equivalent instances in a plurality of to-be-determined instances in a connection diagram. In the process of fusing, the instance relation is further utilized, and based on the connection diagram after the fusion, the instance relations are expanded, and then the above steps of fusing and expanding are performed iteratively, so that the equivalent instances existing in a connection diagram can be identified adequately.

According to another aspect of the present invention, the present invention provides a device for fusing different instances describing the same entity. The device includes an acquiring module, which is used for acquiring a connection diagram comprising a plurality of instances, wherein different nodes in the connection diagram represent different instances, and connection lines between the nodes represent instance relations between the instances corresponding to the nodes; a fusing module, which is used for, based on the instance relations, identifying different instances describing the same entity in the connection diagram, fusing the nodes corresponding to the identified instances, and updating the connection diagram; an expanding module, which is used for, in the updated connection diagram, identifying an instance pair with an unidentified instance relation, and adding a connection line to connect the nodes corresponding to the instances; and an iterating module, which is used for enabling the fusing module and the expanding module to iteratively perform the operation of updating the connection diagram and the operation of adding a connection line, until a specified condition is satisfied.

Optionally, the expanding module in the device described above includes: a correlation calculating module, which is used for calculating a correlation between the instance corresponding to the node and the instance corresponding to a node connected to the node through N nodes for any node in the updated connection diagram, where N is greater than or equal to 1; and a first identifying module, which is used for identifying an instance pair corresponding to two nodes whose correlation reaches a predetermined correlation threshold to be an instance pair having an instance relation, and adding a connection line to connect the two nodes.

Optionally, the specified condition in the device described above is set to be that the number of unidentified instance pairs with instance relation identified by the expanding module in the updated connection diagram is zero.

Optionally, the fusing module in the device described above includes: a grouping module, which is used for grouping the plurality of instances; a similarity calculating module, which is used for calculating a similarity between any two instances in a group based on the instance relation thereof for each group; and a second identifying module, which is used for identifying an instance pair whose similarity reaches a predetermined similarity threshold to be an instance pair describing the same entity.

Optionally, for two instances from different sources, a similarity calculating module calculates a similarity Sim between the two instances according to the formula shown below:

$$Sim = Jac_{ij} / Uniq$$
$$Jac_{ij} = \frac{C_i \cap C_j}{C_i \cup C_j}$$
$$Uniq = \text{Log}(\text{Max}(Cnt_{sourceA,i}, Cnt_{sourceB,j}) + 1)$$

where, $C_i$ is an instance set has an insurance relation with an instance i, is an instance set has an insurance relation with an instance j, $Jac_{ij}$ is an instance relation similarity between i and j, Uniq is a measure for uniqueness of an instance, $Cnt_{sourceA,i}$ is the number of same name instances of instance i in the source A, and $Cnt_{sourceB,j}$ is the number of same name instances of instance j in the source B.

Optionally, the acquiring module in the device described above includes: an attribute similarity calculating module, which is used for calculating an attribute similarity between instances corresponding to any two nodes in the connection diagram; and a second fusing module, which is used for fusing nodes corresponding to two instances whose attribute similarity exceeds a predetermined attribute similarity threshold into one node.

According to yet another aspect of the present invention, the present invention provides a method for fusing different instances describing the same entity. The method includes: acquiring a connection diagram comprising a plurality of instances, where different nodes in the connection diagram represent different instances, and connection lines between the nodes represent instance relations between the instances corresponding to the nodes; based on the instance relations, identifying different instances describing the same entity in the connection diagram, fusing the nodes corresponding to the identified instances, and updating the connection diagram; in the updated connection diagram, identifying an instance pair with an unidentified instance relation, and adding a connection line to connect the nodes corresponding to the instances; iteratively performing the step of updating the connection diagram based on the instance relation and the operation of adding a connection line in the updated connection diagram, until a specified condition is satisfied.

Optionally, in the method described above, the step of identifying an instance pair with an unidentified instance relation in the updated connection diagram includes: calculating a correlation between the instance corresponding to the node and the instance corresponding to a node connected to the node through N nodes for any node in the updated connection diagram, where N is greater than or equal to 1; and identifying an instance pair corresponding to two nodes whose correlation reaches a predetermined correlation threshold to be an instance pair having an instance relation, and adding a connection line to connect the two nodes.

Optionally, in the method described above, the specified condition is set to be that the number of unidentified instance pairs with instance relation identified by the expanding module in the updated connection diagram is zero.

Optionally, in the method described above, the step of identifying different instances describing the same entity in the connection diagram based on the instance relations includes: grouping the plurality of instances; calculating a similarity between any two instances in a group based on the instance relation thereof for each group; and identifying an instance pair whose similarity reaches a predetermined similarity threshold to be an instance pair describing the same entity.

Optionally, in the method described above, for two instances from different sources, a similarity calculating module calculates a similarity Sim between the two instances according to the formula shown below:

$$Sim = Jac_{ij} / Uniq$$
$$Jac_{ij} = \frac{C_i \cap C_j}{C_i \cup C_j}$$
$$Uniq = \text{Log}(\text{Max}(Cnt_{sourceA,i}, Cnt_{sourceB,j}) + 1)$$

where, $C_i$ is an instance set has an insurance relation with an instance i, is an instance set has an insurance relation with an instance j, $Jac_{ij}$ is an instance relation similarity between i and j, Uniq is a measure for uniqueness of an instance, $Cnt_{sourceA,i}$ is the number of same name instances of instance i in the source A, and $Cnt_{sourceB,j}$ is the number of same name instances of instance j in the source B.

Optionally, in the method described above, the step of acquiring a connection diagram comprising a plurality of instances includes: calculating an attribute similarity between instances corresponding to any two nodes in the connection diagram; and fusing nodes corresponding to two instances whose attribute similarity exceeds a predetermined attribute similarity threshold into one node.

The method, device and equipment for fusing different instances of the same entity provided in the present invention utilize a connection diagram to fuse the equivalent instances in a number of instances, where the instance relations in the connection diagram are utilized during the fusing process, and based on the connection diagram after the fusion expand the instance relations, and then based on the expanded instance relation further identify the equivalent instances existing in the connection diagram, and so on, iteratively performing the above steps of fusing and expanding, such that the solution based on the present invention is able to adequately identify the instance pairs describing the same entity.

Other features and advantages of the present invention will become apparent from the following detailed description of exemplary embodiments of the present invention with reference to the attached drawings.

BRIEF DESCRIPTION OF THE DRAWINGS

The accompanying drawings, which are incorporated in and constitute a part of the specification, illustrate the embodiments of the present invention and, together with the description, serve to explain the principles of the present invention.

DESCRIPTION OF THE EMBODIMENTS

Various exemplary embodiments of the present invention will now be described in detail with reference to the accompanying drawings. It should be noted that the relative arrangement of the components and steps, the numerical expressions, and numerical values set forth in these embodiments of the present invention do not limit the scope of the present invention unless it is specifically stated otherwise.

The following description of at least one exemplary embodiment is merely descriptive in nature and is in no way intended to limit the invention or the application or use thereof.

For all examples shown and discussed herein, any specific value should be interpreted as for description only and not as a limitation. Therefore, other examples of the embodiments may have different values.

It should be noted that similar reference numerals and letters refer to similar items in the following figures, and therefore, once an item is defined in one figure, further discussion is not required in subsequent figures.

Before describing the present invention in detail, a brief description of several concepts involved in the present invention will be provided first.

Entity: A knowledge unit in a knowledge map that has a uniquely identified identity.

Instance: Data from various sources used in the construction of an entity in a knowledge map.

Instance relation: The relation existing between instances, for data from different sources, the relation herein can be an attribute relation, a citation relation, a link relation, and other types of relation.

Same name instance: the instances that have the same instance name but describe different entities (contents).

Equivalent instance: An instance that describes the same entity (content).

For example, various entries in the Baidu Encyclopedia are instances. The entry "Li Ning" in the Baidu Encyclopedia is a polysemy, it may refer to a famous gymnast Li Ning, or it may refer to a magician Li Ning. Herein, Li Ning, who refers to the magician and Li Ning, who refers to the gymnast, are the instance of the same name. Under the entry of Li Ning, which refers to the famous gymnast, there are also entries such as "Olympic Champion" and "Gold Medal" and so on. Here, we believe that there is an instance relation between "Li Ning" and "Olympic Champion" and "Gold Medal". In addition, the "Li Ning" in the Baidu Encyclopedia referring to the gymnast and the "Prince of gymnastics" in the Sogou Encyclopedia are equivalent instances.

The present invention mainly provides a solution for identifying equivalent instances from a plurality of instances. This technical solution identifies equivalent instances mainly based on a connection diagram and continuously updates the connection diagram so as to identify more equivalent instances.

Figure 1:
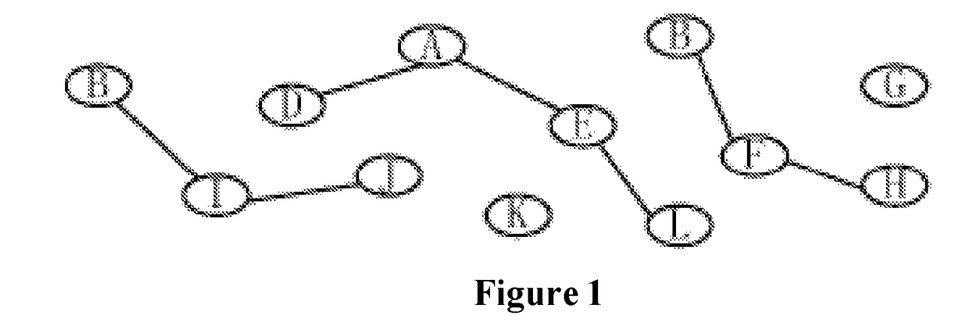
FIG. 1 is a schematic view of the connection diagram according to the present invention.

Specifically, a connection diagram containing a plurality of instances can be constructed first. As shown in FIG. 1, the nodes in the connection diagram represent instances, and the connection lines between the nodes represent instance relations. For multiple instances in the connection diagram, equivalent instances can be identified according to the instance relations shown in the connection diagram, and the nodes corresponding to the identified equivalent instances are then fused. In this case, after the step of fusing the nodes in the connection diagram according to the instance relations, instance relations not identified in the connection diagram may be further identified based on a certain identification rule, and the connection diagram is next updated according to the newly identified instance relations. Subsequently, the steps for finding equivalent instances based on instance relation and the step of identifying an unidentified instance relation based on the fused connection diagram are repeatedly performed until a specified condition is satisfied.

The specified condition herein may be that a new instance relation cannot be found or a new equivalent instance cannot be found or the repeated steps reach a certain number of times, and of course, may also be other specified conditions. In addition, in the technical solution of the present invention, the steps of fusing equivalent instances and updating the connection diagram may be that all the equivalent instances in the connection diagram are fused and then the connection diagram is updated.

Figure 2:
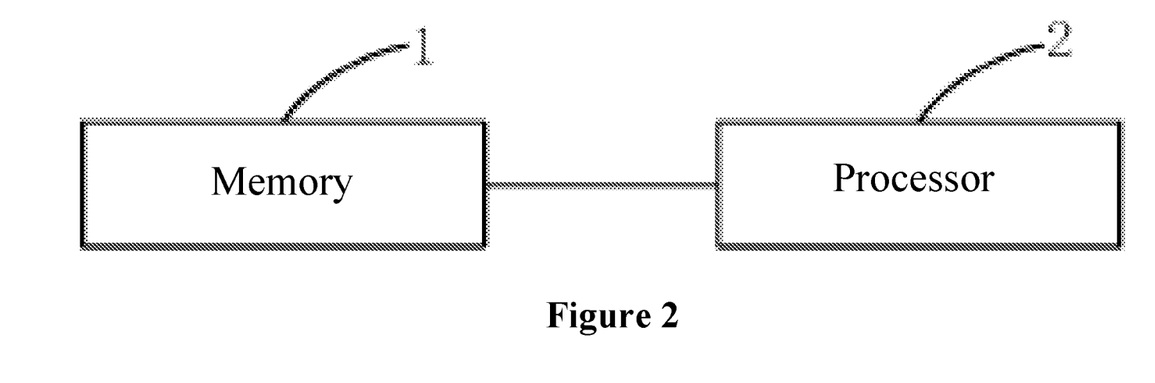
FIG. 2 is a schematic view of the structure of a computing device according to one embodiment of the present invention.

The technical solution of the present invention can be implemented as a computing device as shown in FIG. 2. The computing device may be configured to include a memory 1 and a processor 2. Memory 1 can store a connection diagram containing a plurality of instances. The processor 2 is connected to the memory 1, and a connection diagram can be acquired from the memory 1 by the processor, and operations that implement related steps in the technical solution mentioned above can also be performed by the processor.

Specifically, the processor 2 may be, for example, a central processing unit CPU, a microprocessor MCU, or the like, and the memory 1 includes, for example, a ROM (Read Only Memory), a RAM (Random Access Memory), a non-volatile memory such as a hard disk, and the like. It should be understood that although the computing device shown in FIG. 2 includes only the memory 1 and the processor 2, the computing device may also include an interface device, a communication device, a display device, an input device, a speaker, a microphone, and so on. However, these components are not related to the present invention, so they are omitted herein. In the present invention, the physical implementation of the computing device is not limited. The computing device may be a server, such as a blade server, or may be a computer or a computer-like electronic device, such as a notebook computer, a tablet, and so on.

The technical solution of the present invention may also be implemented as a device containing multiple functional modules. Among them, the function of the processor 2 shown in FIG. 2 can be implemented by corresponding functional modules in the device.

Figure 3:
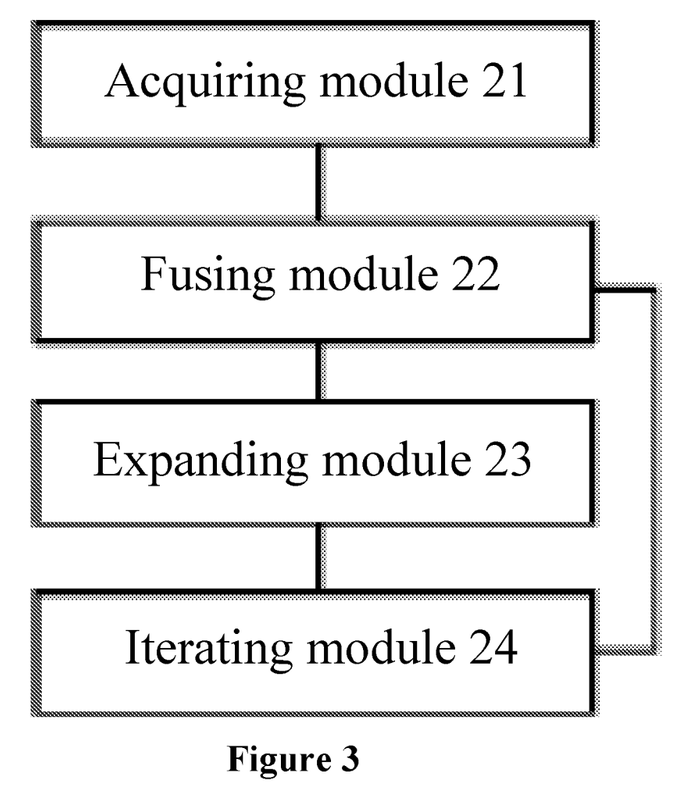
FIG. 3 shows the functional modules of the device for fusing different instances describing the same entity according to one embodiment of the present invention.

In reference to FIG. 3, a device for merging different instances describing the same entity according to the present invention may include an acquiring module 21, a fusing module 22, an expanding module 23, and an iterating module 24. Among them, the acquiring module 21, the fusing module 22, the expanding module 23, and the iterating module 24 can perform the operations of implementing the corresponding steps of the technical solution mentioned above. In brief, the acquiring module 21 can acquire the connection diagram. The fusing module 22 can identify the equivalent instances in the connection diagram based on the instance relations shown in the connection diagram, and fuse the nodes corresponding to the identified equivalent instances. The expanding module 23 can identify the instance relations not yet identified in the connection diagram. The iterating module 24 can enable the fusing module 22 and the expanding module 23 to iterate through the respective operations until a specified condition is satisfied.

Figure 4:
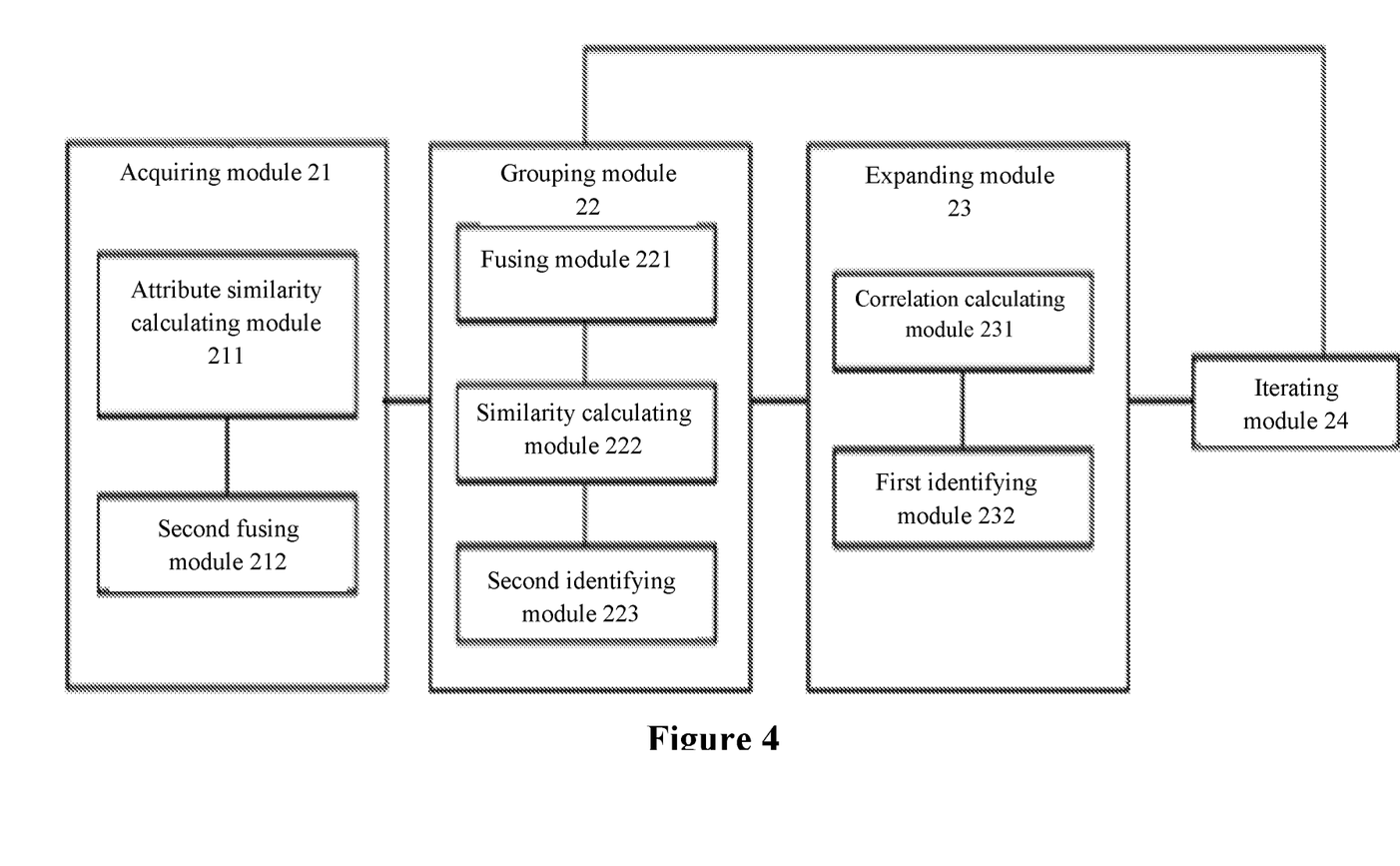
FIG. 4 shows the functional modules of the device for fusing different instances describing the same entity according to another embodiment of the present invention.

In reference to FIG. 4, the acquiring module 21 can include an attribute similarity calculating module 211 and a second fusing module 212. The fusing module 22 can include a grouping module 221, a similarity calculating module 222 and a second identifying module 223. The expanding module 23 can include a correlation calculating module 231 and a first identifying module 232. For the structure shown in FIG. 4, the respective functions of the acquiring module 21, the fusing module 22 and the expanding module 23 can be implemented by the sun-modules included therein, which will not be further described in detail herein.

FIGS. 5 to 8 show in detail a flowchart of a technical solution for implementing the present invention. In the foregoing figures, each step shown in FIGS. 5 to 8 can be implemented by a corresponding functional module in the processor or device mentioned above. The workflow of the technical solution of the present invention will be described in detail below in reference to FIGS. 5 to 8.

Figure 5:
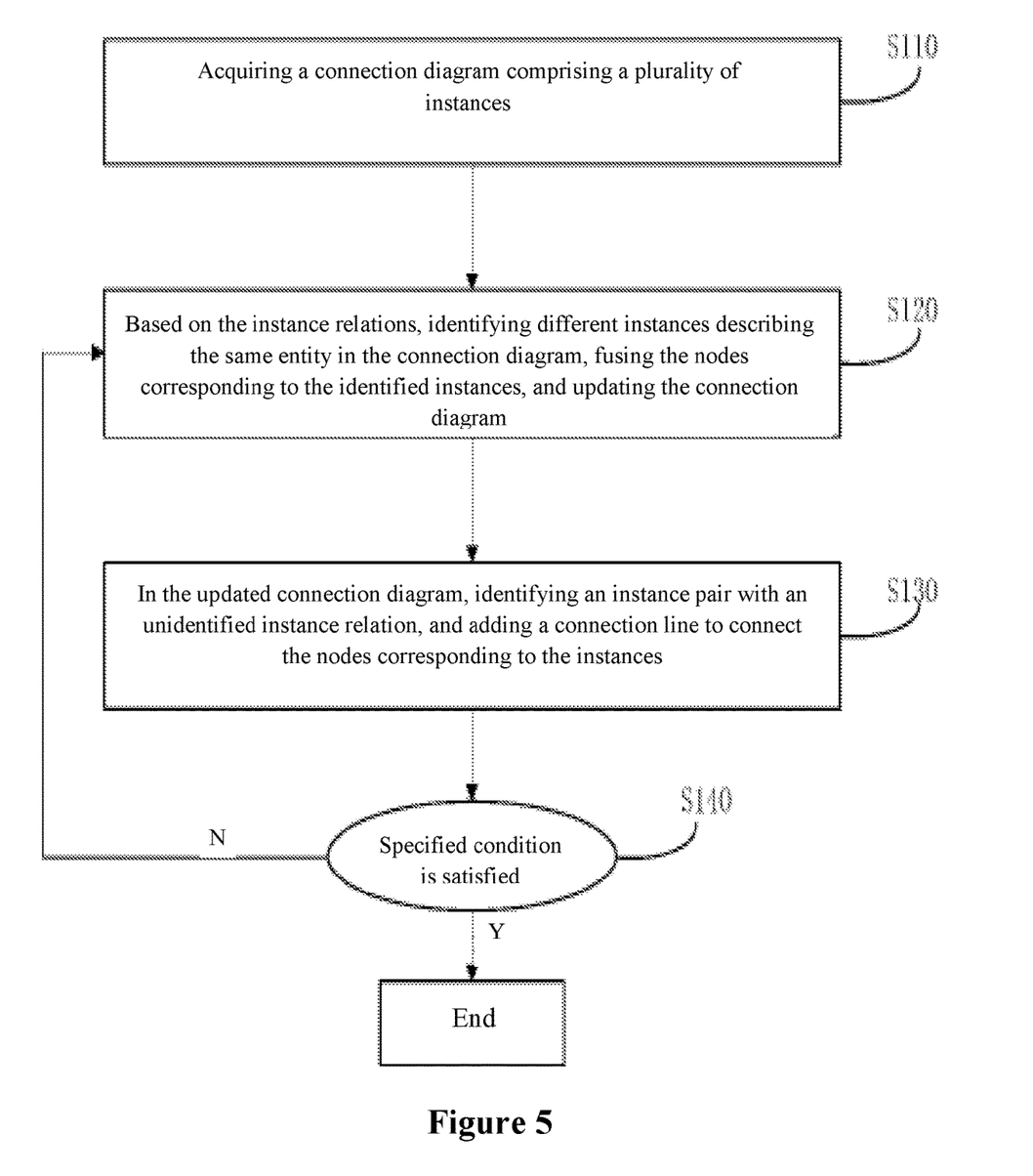
FIG. 5 is a schematic view of the flow chart of the method for fusing different instances describing the same entity according to one embodiment of the present invention.

In reference to FIG. 5, in step S110, by means of the processor 2 or the acquiring module 21, a connection diagram containing a plurality of instances can be acquired.

The steps of acquiring a connection diagram mentioned here may be to acquire a connection diagram that is created previously. For example, a connection diagram may be constructed in advance from a plurality of instances, and then stored in a memory, and acquired from the memory by the processor 2 or the acquiring module 21 when in need.

It is also possible to construct a connection diagram based on the instance data needed to be determined. For example, a connection diagram may be constructed based on a plurality of instance data to be determined and the instance relations existing in the instance data. For a constructed connection diagram, it may be stored in a memory, and when a processing is needed, the processor 2 or the acquiring module 21 may acquire the connection diagram from the memory. Of course, the constructed connection diagram may also be directly sent to the processor 2 or the acquiring module 21.

In the process of performing step S110, the equivalent instances existing in the connection diagram may also be identified based on a certain identification rule, and the nodes corresponding to the equivalent instances are then fused. The identification rule described herein can be the identification method based on the attribute similarity as shown in FIG. 6.

Figure 6:
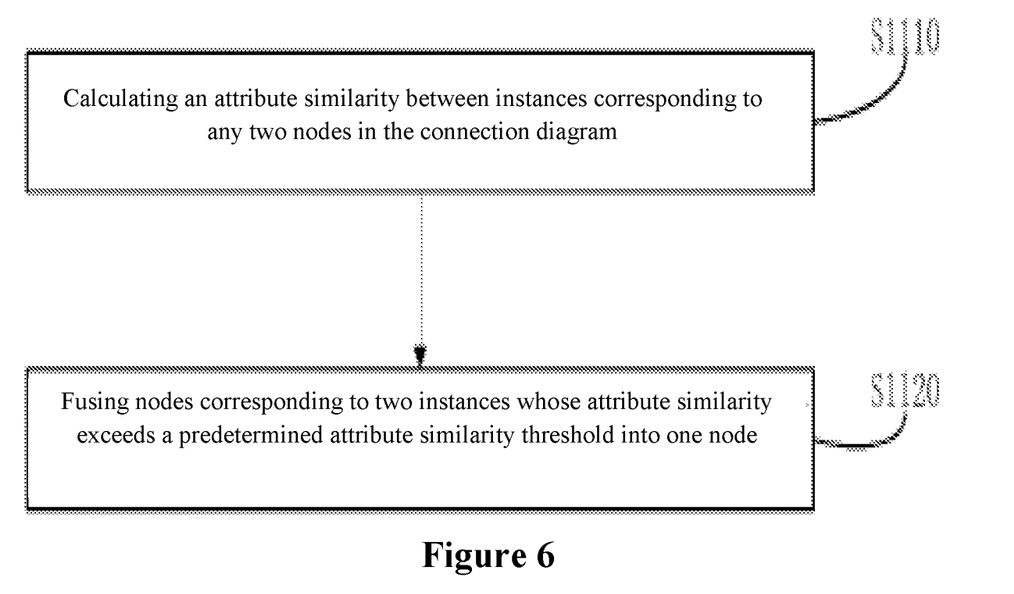
FIG. 6 is a schematic view of the flow chart of the sub-steps included in step S110 as shown in FIG. 5.

As shown in FIG. 6, in step S1110, an attribute similarity between instances corresponding to any two nodes in the connection diagram is calculated by the processor 2 or the attribute similarity calculating module 211 in the acquiring module 21.

In step S1120, the nodes corresponding to the instances whose attribute similarity exceeds a predetermined attribute similarity threshold are fused into one node by the processor 2 or the second fusing module 212 in the acquiring module 21.

It should be appreciated that the step of fusing the nodes in the connection diagram in step S110 (step S110, step S1120) is an optional solution of the present invention, so that the equivalent instances existing in the connection diagram can be preliminarily identified based on the currently available calculation method, which are then fused, so as to reduce the complexity of the subsequent steps.

Returning to step S110, after step S110 is performed, step S120 may be performed next. The processor 2 or the fusing module 21 may identify different instances describing the same entity (that is, equivalent instances) in the connection diagram based on the instance relation. The nodes corresponding to the identified equivalent instances are then fused and the connection diagram is updated.

In the foregoing step, there are many ways to identify equivalent instances in the connection diagram based on the instance relation. For example, in the process of calculating a similarity between instances, an instance having an instance relation with the current instance may be involved in the calculation of the similarity, and then an instance pair whose similarity exceeds a threshold may be identified as the equivalent instances.

Figure 7:
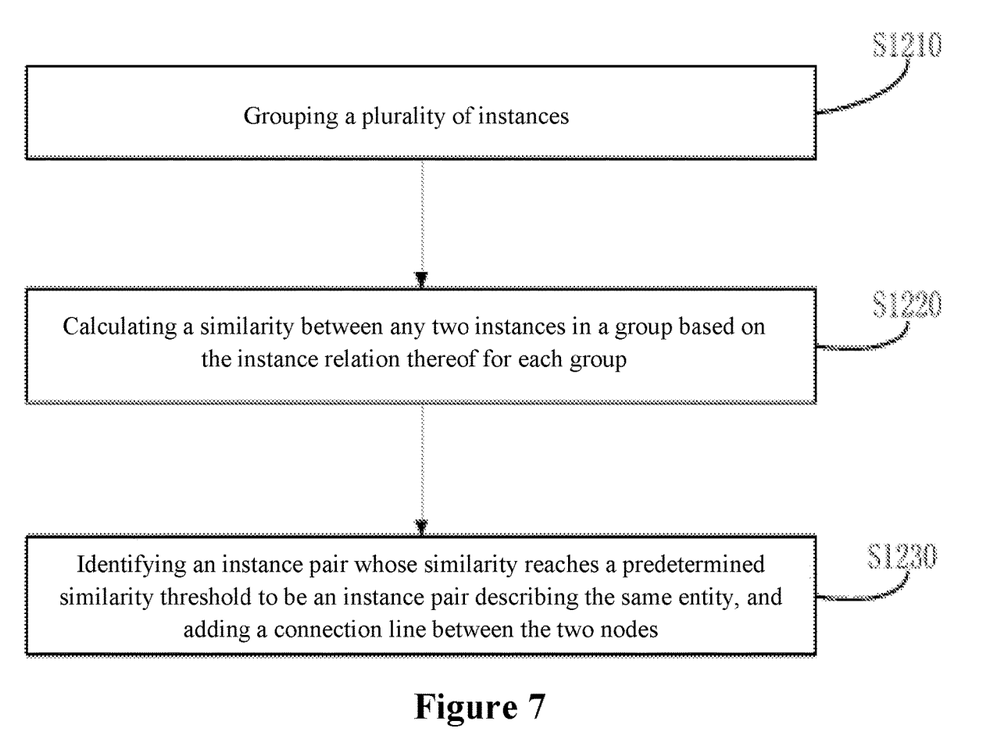
FIG. 7 is a schematic view of the flow chart of the sub-steps included in step S120 as shown in FIG. 5.

FIG. 7 shows a specific embodiment for identifying an equivalent instance based on an instance relation.

As shown in FIG. 7, in step S1210, a plurality of instances in the connection diagram are grouped by the processor 2 or the grouping module 221 in the fusing module 22.

In this case, there can be a variety of grouping methods, such as grouping by name, or by property value. Of course, there are other grouping methods depending on the specific situation, which will not be described herein.

At step S1220, for each group, a similarity between any two instances within the group may be calculated by the processor 2 or the similarity calculating module 222 in the grouping module 22 based on the instance relation.

In this case, for two instances from different data sources, the similarity Sim between the two instances can be calculated according to the following formula:

$$Sim = Jac_{ij} / Uniq$$

$$Jac_{ij} = \frac{C_i \cap C_j}{C_i \cup C_j}$$

$$Uniq = \text{Log}(\text{Max}(Cnt_{sourceA,i}, Cnt_{sourceB,j}) + 1)$$

where, $C_i$ is an instance set has an insurance relation with an instance i, $C_j$ is an instance set has an insurance relation with an instance j, $Jac_{ij}$ is an instance relation similarity between i and j, Uniq is a measure for uniqueness of an instance, $Cnt_{sourceA,i}$ is the number of same name instances of instance i in the source A, and $Cnt_{sourceB,j}$ is the number of same name instances of instance j in the source B.

In this case, for the instance data from different sources, the above formula can have different forms of conversion for different sources of instance data. Taking the instance data source as an encyclopedia entry, the similarity Sim between two instances from different encyclopedias can be calculated based on the following formula:

$$Sim = (\alpha \times Jac_{out} + (1 - \alpha) \times Jac_{in}) / Uniq$$

$$Jac_{out} = \frac{C_{iout} \cap C_{jout}}{C_{iout} \cup C_{jout}}, Jac_{in} = \frac{C_{iin} \cap C_{jin}}{C_{iin} \cup C_{jin}}$$

$$Uniq = Log(Max(Cnt_{sourceA,i}, Cnt_{sourceB,j}) + 1)$$

where, a is a weight coefficient, $C_{iout}$ is the number of instances linked out from the instance i to be determined, $C_{jout}$ is the number of instances linked out from the instance j to be determined, $C_{iin}$ is the number of instances linked in to the instance i to be determined, $C_{jin}$ is the number of instances linked in to the instance j to be determined, $Jac_{out}$ is a similarity between the instances linked out from the instances i and j to be determined, $Jac_{in}$ is a similarity between the instances linked in to the instances i and j to be determined, Uniq is a measure for uniqueness of an instance, $Cnt_{sourceA,i}$ is the number of same name instances of instance i in the source A, and $Cnt_{sourceB,j}$ is the number of same name instances of instance j in the source B.

Taking the Baidu Encyclopedia and Sogou Encyclopedia as examples, the foregoing formula will be further described as follows. Taking the Baidu Encyclopedia entry "Li Ning" and the Sogou Encyclopedia entry "Li Ning" as the example, in the Baidu Encyclopedia, the entry "Li Ning" has 60 instances with the same name. In the Sogou Encyclopedia, the entry "Li Ning" has 52 instances with the same name. For Li Ning, who represents the gymnast, there are internally linked entries such as "Olympic Champion", "Gold Medal", and "Free Exercise" in the Baidu Encyclopedia. There is an instance relation between these entries and Li Ning. These entries thus can be seen as the entries (instances) linked out from the entry "Li Ning". As for the entry "Li Ning" that exists under the entry "Prince of gymnastics", in this case, the "Prince of gymnastics" is an entry (instance) linked to the entry "Li Ning", and there is also an instance relation between the entry "Prince of gymnastics" and the entry "Li Ning." As a result, based on the formula provided above, the similarity between the entry "Li Ning" in the Baidu Encyclopedia and the "Li Ning" in the Sogou Encyclopedia can be calculated.

In the foregoing case, the calculation formulas can be implemented in parallel on a distributed computing platform' such as SPARK, so as to achieve the purpose of large scale parallel calculation. In addition, it should be known that for other source instance data, there may also be other similarity calculation methods based on the instance relation, which will not be described herein.

In step S1230, the instance pair whose similarity reaches a predetermined similarity threshold is identified as the equivalent instance by the processor 2 or by the second identifying module 223 in the grouping module 22. In this way, it is possible to identify the equivalent instances existing in the connection diagram based on the instance relation.

Returning to step S120, after step S120 is performed, step S130 may then be performed. The processor 2 or the expending module 23 may identify the instance pair with the instance relation that has not been identified in the updated connection diagram and then add a connection line to connect the nodes corresponding to the instance pair.

For the connection diagram after step S120 is executed, due to the fusing of equivalent instances, the instance relations in the fused connection diagram also undergoes certain changes. At this point, certain identification rules can be used to identify instance pairs that have new instance relations in the connection diagram.

Figure 8:
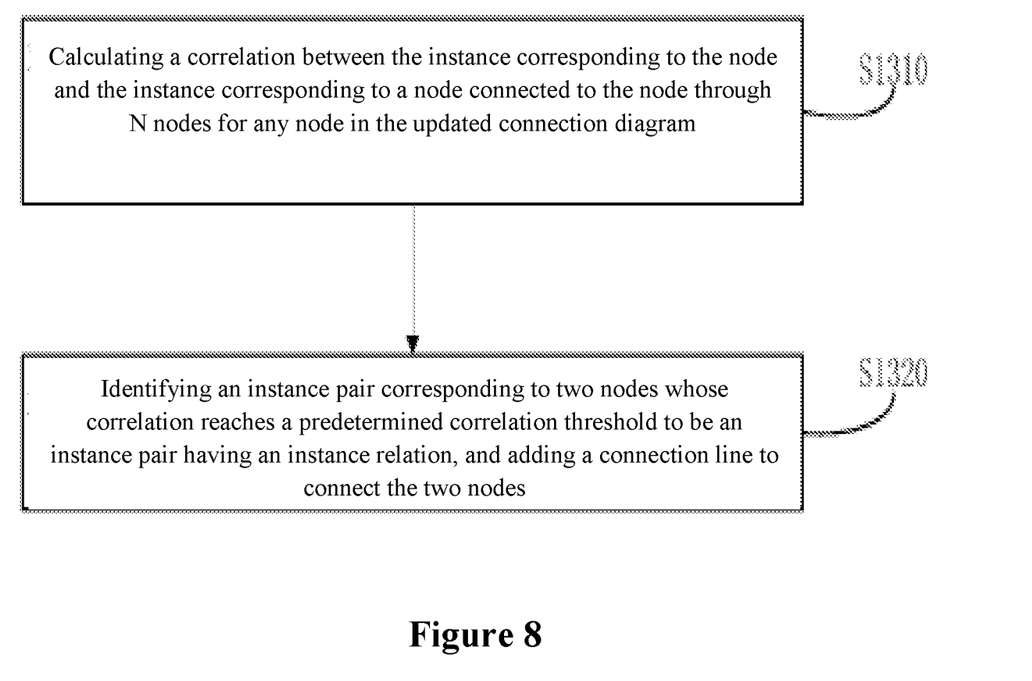
FIG. 8 is a schematic view of the flow chart of the sub-steps included in step S120 as shown in FIG. 5.

FIG. 8 shows a specific embodiment of identifying an instance relation previously not identified in the connection diagram.

As shown in FIG. 8, in step S1310, for any node in the updated connection diagram, a correlation between the instance corresponding to the node and the instance corresponding to a node connected to the node through N nodes by the correlation calculating module 231 in the expanding module 23, where N is greater than or equal to 1.

In step S1320, the instance pair corresponding to the two nodes whose correlation degree reaches a predetermined correlation threshold is identified by the processor 2 or the first identifying module 232 in the expanding module 23 as an instance pair with an instance relation, and a connection line is added to connect the two nodes.

In this case, there may be many ways to calculate the correlation. For example, for nodes D and node L shown in FIG. 1, node D and node L are connected through two nodes, node A and node E, so that the degree of similarity between node A and node E can be analyzed so as to determine whether there is a correlation between node D and E.

Returning to step S130, step S140 may be performed on the connection diagram with the expanded instance relations through step S130. The processor 2 or the iterating module 24 may determine whether the specified condition is satisfied, and returns to step S120 if the specified condition is not satisfied. The steps of S120, S130, and S140 will be then repeatedly performed, until the specified condition is satisfied, and the fused connection diagram is then output.

In this case, the specified condition in step S140 may be repeatedly performing steps S120, S130, S140 for a certain number of times. Alternatively, in the process of repeatedly performing steps S120, S130 and S140, in step S120, no new equivalent instance can be found in the connection diagram with the expanded instance relations (as a preference, it may be that the step S120 is repeated multiple times without the identification of new equivalent instance). It can also be that during the execution of S130, no new instance relation can be identified. As a preference, that a new instance relation cannot be found during the execution of S130 can be used as a specified condition.

Thus, a method, a device and equipment for fusing different instances describing the same entity according to the present invention have been described in detail with reference to the accompanying drawings. From the above description, it can be seen that the method, device and equipment for fusing different instances describing the same entity according to the present invention can fuse equivalent instances from multiple instances using a connection diagram. In the process of fusing, the existing instance relations in the connection diagram are used, and the instance relations are expanded based on the fused connection diagram. Then, based on the expanded instance relations, new equivalent instances existing in the connection diagram can be further discovered, and so on. It iteratively performs the above-mentioned fusing and expanding steps so that the connection diagram can be spread in a parallel way, and the solution based on the present invention can find equivalent instances in a better way.

Furthermore, the method according to the invention can also be implemented as a computer program including computer program code instructions for performing the above steps defined in the above-described method of the present invention. Alternatively, the method according to the present invention may also be implemented as a computer program product, and the computer program product includes a computer readable medium, and the computer readable medium stores the computer program for performing the above steps defined in the above-described method of the present invention. It is also appreciated to a person skilled in the art that various exemplary logical blocks, modules, circuits, and algorithm steps described in connection with the disclosure herein may be implemented as electronic hardware, computer software, or a combination of both.

The flowchart and block diagrams in the figures illustrate the architecture, functionality, and operation of possible implementations of systems and methods in accordance with various embodiments of the present invention. In this regard, each block in the flowchart or block diagram may represent a module, a portion of a program, or a portion of code, which may include one or more elements for performing the executable instructions for certain logical functions. It should also be noted that in some implementations, as an alternative, the functions labeled in the blocks may also occur in a different order than is marked in the figures. For example, two consecutive blocks may actually be executed substantially in parallel, and they may sometimes be executed in a reverse order, depending on the functions involved. It is also to be noted that each block in the block diagrams and/or flowcharts, and combinations of blocks in the block diagrams and/or flowcharts, can be implemented with a dedicated hardware-based system that performs the specified function or operation; or it can be implemented with a combination of dedicated hardware and computer instructions.

The foregoing has described various embodiments of the present invention. The above description is exemplary, not exhaustive, and is not limited to the disclosed embodiments. Without departing from the scope and spirit of the described embodiments, many modifications and variations will be apparent to a person of ordinary skill in the art. The terminology used herein is chosen to best explain the principles of the embodiments, the practical application or improvement of the technology in the marketplace, or to enable others of ordinary skill in the art to understand the embodiments disclosed herein.

The invention claimed is:

1. A computing device, comprising:
a memory for storing a connection diagram comprising a plurality of instances, wherein different nodes in the connection diagram represent different instances, and connection lines between the nodes represent instance relations between the instances corresponding to the nodes; and
a processor connected to the memory, wherein the processor is configured to acquire the connection diagram from the memory, and the processor is configured to:
based on the instance relations, identify different instances describing the same entity in the connection diagram, fuse the nodes corresponding to the identified instances, and update the connection diagram;
in the updated connection diagram, identify an instance pair with an unidentified instance relation, and add a connection line to connect the nodes corresponding to instances in the instance pair;
iteratively perform the step of updating the connection diagram based on the instance relations and the operation of adding a connection line in the updated connection diagram until a specified condition is satisfied.

2. A computer program product for fusing different instances describing the same entity, the computer program product comprising non-transitory computer readable medium storing computer program instructions for:
acquiring a connection diagram comprising a plurality of instances, wherein different nodes in the connection diagram represent different instances, and connection lines between the nodes represent instance relations between the instances corresponding to the nodes;
based on the instance relations, identifying different instances describing the same entity in the connection diagram, fusing the nodes corresponding to the identified instances, and updating the connection diagram;
in the updated connection diagram, identifying an instance pair with an unidentified instance relation, and adding a connection line to connect the nodes corresponding to instances in the instance pair; and
iteratively performing the operation of updating the connection diagram and the operation of adding a connection line until a specified condition is satisfied.

3. The computer program product according to claim 2, wherein the non-transitory computer readable medium stores the computer program instructions for:
calculating a correlation between a first instance corresponding to a first node and a second instance corresponding to a second node connected to the first node through N nodes in the updated connection diagram, wherein N is greater than or equal to 1;
identifying an instance pair corresponding to two nodes whose correlation reaches a predetermined correlation threshold to be an instance pair having an instance relation, and adding a connection line to connect the two nodes.

4. The computer program product according to claim 2, wherein the specified condition is set as:
the number of unidentified instance pairs with instance relation in the updated connection diagram is zero.

5. The computer program product according to claim 2, wherein the non-transitory computer readable medium stores the computer program instructions for:
grouping the plurality of instances;
calculating a similarity between any two instances in a group based on instance relation thereof for each group; and
identifying an instance pair whose similarity reaches a predetermined similarity threshold to be an instance pair describing the same entity.

6. The computer program product according to claim 5, wherein, for two instances from different sources, the non-transitory computer readable medium stores the computer program instructions for calculating a similarity Sim between the two instances according to the formula shown below:

$$Sim = Jac_{ij} / Uniq$$

$$Jac_{ij} = \frac{C_i \cap C_j}{C_i \cup C_j}$$

$$Uniq = \text{Log}(\text{Max}(Cnt_{sourceA,i}, Cnt_{sourceB,j}) + 1)$$

wherein $C_i$ is an instance set has an insurance relation with an instance i, wherein $C_j$ is an instance set has an insurance relation with an instance j, wherein $Jac_{ij}$ is an instance relation similarity between i and j, wherein Uniq is a measure for uniqueness of an instance, wherein $Cnt_{sourceA,i}$ is the number of same name instances of instance i in the source A, and wherein $Cnt_{sourceB,j}$ is the number of same name instances of instance j in the source B.

7. The computer program product according to claim 2, wherein the non-transitory computer readable medium stores the computer program instructions for:
   calculating an attribute similarity between instances corresponding to any two nodes in the connection diagram; and
   fusing nodes corresponding to two instances whose attribute similarity exceeds a predetermined attribute similarity threshold into one node.

8. A method for fusing different instances describing the same entity, comprising:
   acquiring a connection diagram comprising a plurality of instances, wherein different nodes in the connection diagram represent different instances, and connection lines between the nodes represent instance relations between the instances corresponding to the nodes;
   based on the instance relations, identifying different instances describing the same entity in the connection diagram, fusing the nodes corresponding to the identified instances, and updating the connection diagram;
   in the updated connection diagram, identifying an instance pair with an unidentified instance relation, and adding a connection line to connect the nodes corresponding to instances in the instance pair; and
   iteratively performing the step of updating the connection diagram based on the instance relation and the operation of adding a connection line in the updated connection diagram until a specified condition is satisfied.

9. The method according to claim 8, wherein the step of, in the updated connection diagram, identifying an instance pair with an unidentified instance relation comprises:
   calculating a correlation between a first instance corresponding to a first node and a second instance corresponding to a second node connected to the first node through N nodes in the updated connection diagram, wherein N is greater than or equal to 1; and
   identifying an instance pair corresponding to two nodes whose correlation reaches a predetermined correlation threshold to be an instance pair having an instance relation, and adding a connection line to connect the two nodes.

10. The method according to claim 8, wherein the specified condition is set as:
    the number of unidentified instance pairs with instance relation in the updated connection diagram is zero.

11. The method according to claim 8, wherein the step of, based on the instance relations, identifying different instances describing the same entity in the connection diagram comprises:
    grouping the plurality of instances;
    calculating a similarity between any two instances in a group based on instance relation thereof for each group; and
    identifying an instance pair whose similarity reaches a predetermined similarity threshold to be an instance pair describing the same entity.

12. The method according to claim 11, further comprising, for two instances from different sources, calculating a similarity Sim between the two instances according to the formula shown below:

$$Sim = Jac_{ij} / Uniq$$

$$Jac_{ij} = \frac{C_i \cap C_j}{C_i \cup C_j}$$

$$Uniq = Log(Max(Cnt_{sourceA,i}, Cnt_{sourceB,j}) + 1)$$

wherein $C_i$ is an instance set has an insurance relation with an instance i, wherein $C_j$ is an instance set has an insurance relation with an instance j, wherein $Jac_{ij}$ is an instance relation similarity between i and j, Uniq is a measure for uniqueness of an instance, wherein $Cnt_{sourceA,i}$ is the number of same name instances of instance i in the source A, and wherein $Cnt_{sourceB,j}$ is the number of same name instances of instance j in the source B.

13. The method according to claim 8, wherein the step of acquiring the connection diagram comprising a plurality of instances comprises:
    calculating an attribute similarity between instances corresponding to any two nodes in the connection diagram; and
    fusing nodes corresponding to two instances whose attribute similarity exceeds a predetermined attribute similarity threshold into one node.

* * * * *